Patented Dec. 29, 1953

2,664,446

UNITED STATES PATENT OFFICE 2,664,446

ALDAL CONDENSATION

Francis Richard Charlton and Dennis Albert Dowden, Norton-on-Tees, England, assignors to Imperial Chemical Industries Limited, a corporation of Great Britain No Drawing. Application June 14, 1950, Serial No. 168,174

Claims priority, application Great Britain June 30, 1949

7 Claims. (Cl. 260—594)

This invention relates to organic hydroxy compounds.

It is known to produce aldol condensation products from carbonyl compounds, in particular di-acetone alcohol from acetone, by contacting the carbonyl compounds in the liquid state with granular condensation catalysts comprising a basic hydroxide, oxide, carbonate or oxychloride of a metal of group II of the periodic table and there has been disclosed among others a catalyst produced by mixing hydrated lime, Portland cement, kieselguhr, sodium hydroxide, and water into a paste and granulating. However, we have found that this process is not entirely satisfactory, since the reaction velocity is rather low and the catalyst life is short.

According to the present invention aldol condensation products are produced from carbonyl compounds by bringing the carbonyl compound into contact in the liquid phase at a moderate temperature with a catalyst comprising calcium oxide, calcium hydroxide, hydrous calcium oxide or hydrous calcium hydroxide, supported on a lithia-alumina complex analogous to sodium-beta-alumina and to the spinels with a defective lattice.

The process is of greatest value in relation to the production of di-acetone alcohol from acetone. Di-acetone alcohol is useful as a solvent for nitrocellulose, cellulose acetate and many natural and synthetic resins, e. g., rosin, ester gum, kauri, copal and some alkyd and phenolic resins.

In producing di-acetone from acetone according to the invention the temperature should not exceed 30° C. since above this temperature the equilibrium concentration of di-acetone alcohol in the mixture is so low that the process becomes uneconomic. While temperature of from 0° C. to 30° C. are suitable, it is preferred on account of the greater reaction velocity achieved to employ a temperature of 10° C. to 25° C., especially about 20° C.

The process may be conducted in conventional apparatus, for example by passing the liquid carbonyl compound through a bed, or number of beds, of catalyst contained in a reactor which is preferably provided with a jacket and/or coils through which a temperature controlling medium is passed. To reduce pressure drop and minimize catalyst carry-over in the product it is preferred to use a granular catalyst.

The process may be operated batchwise or continuously. It is preferred to operate continuously. When operating continuously a suitable liquid space velocity is up to 1 litre per litre of bulk catalyst volume per hour. One method is to employ a high space velocity and to recycle at least a portion of the product to the reaction zone. In this way a high output is obtained. We have found that most frequently a liquid space velocity of about 0.5 litre/litre of bulk catalyst volume per hour is preferable.

The di-acetone alcohol may be separated from the product by flash distillations, whereby the bulk of the acetone is removed as distillate, followed by fractional distillation of the bottom product under reduced pressure.

It is preferred to operate so that the catalyst is immersed in liquid, since if the liquid only trickles over the catalyst there is poor contact and lower efficiency. Satisfactory working is accomplished by feeding the liquid to the top of a reactor and controlling the rate of withdrawal from the bottom thereof by means of a cock, so that the catalyst is always covered.

The lithia-alumina complex is prepared by impregnating gamma-alumina as hereinafter defined with a solution of lithium salt and igniting the product at a temperature in excess of 600° C. The catalyst may be prepared by washing the lithia alumina complex, crushing to granules, and impregnating these with a soluble calcium compound capable of thermal decomposition to the oxide. The impregnated granules are then heated to a sufficiently high temperature to yield the oxide.

A typical catalyst suitable for use in the process of the invention was prepared as follows. 2000 grams of gamma-alumina previously washed with dilute nitric acid and ignited at 450° C., was soaked in a solution comprising 907 grams of water and 527 grams of lithium nitrate trihydrate, the impregnated material was ignited at 950° C. for 15 hours and there was obtained a crude lithia-alumina complex.

This was washed with dilute nitric acid, and then copiously with water, to dissolve unreacted lithium compounds. The product was ground to $\frac{1}{16}''$ to $\frac{1}{8}''$ granules and these were steeped in melted calcium nitrate trihydrate until they were saturated with calcium nitrate. The steeped granules were drained and heated at a temperature sufficiently in excess of 561° C., the melting point of calcium nitrate, to decompose the nitrate, e. g., 750° C.

By "gamma-alumina" in this specification is meant the species boehmite or hydrargillite, such as may be obtained by precipitation from soluble aluminium compounds e. g., by alkali, and calcination at 400° to 600° C.

Catalysts prepared in this manner are very active in the process of the invention, and have a longer life than previously known catalysts. A catalyst of this sort can be reactivated by calcining at about 750° C., but with some, albeit small, loss in activity. We have found that the activity of such a catalyst calcined in this manner and subsequently damped with water and dried at 450° C. is very largely restored and that the catalyst has a longer life than when not so treated. This method of reactivation is regarded as an important feature of the present invention.

The benefits of the invention are well brought out by the following comparative data.

The catalyst employed was prepared by the method described above, and contained calcium compounds equivalent to 10% by weight of calcium oxide. (It is not known whether the active catalyst under reaction conditions comprises calcium oxide or hydroxide or a mixture of these compounds.)

A reaction temperature of 20° to 25° C. and a liquid space velocity of 0.5 litre per litre of bulk catalyst volume per hour were employed. The flow of liquid was upwardly through the catalyst.

| History of catalyst | Initial conversion, weight percent | Conversion, weight percent | Time at which conversion measured, hours |
|---|---|---|---|
| Fresh catalyst | 11.5 | 8 | 335 |
| Same catalyst calcined at 750° C. for 3 hours | 12 | 7 | 330 |
| Same catalyst calcined at 750° C. for 5 hours | 9 | 9 | 35 |
| Same catalyst calcined at 750° C. for 1 hour, cooled, damped with water and dried at 450° C. for 2 hours | 12 | 10 | 330 |
| Do | 12 | 7 | 470 |

The process of the invention is also applicable to methyl ethyl, methyl propyl, and methyl isopropyl, ketones, which yield respectively: 3-methyl heptan-3-ol-5-one and 3,4-dimethyl hexan-3-ol-5-one; 4-methylnonan-4-ol-6-one and 4-methyl-5-ethyl heptan-4-ol-6-one; and 2,3-6-trimethyl heptan-3-ol-5-one and 2,3,4,4-tetramethyl hexan-3-ol-5-one. Similar conditions to those mentioned above are suitable.

We claim:

1. A continuous process for the production of aldol condensation products which comprises bringing a carbonyl compound into contact in the liquid phase at a moderate temperature with a catalyst comprising a calcium compound selected from calcium oxide calcium hydroxide, hydrous calcium oxide and hydrous calcium hydroxide, supported on granules of a lithia-alumina complex analogous to sodium beta-alumina and to the spinels with a defective lattice.

2. A continuous process for the production of aldol condensation products which comprises bringing a ketone into contact in the liquid phase at a temperature of from 0° to 30° C. with a catalyst comprising a calcium compound selected from calcium oxide, calcium hydroxide, hydrous calcium oxide and hydrous calcium hydroxide, supported on granules of a lithia-alumina complex analogous to sodium beta-alumina and to the spinels with a defective lattice.

3. A continuous process for the production of di-acetone alcohol which comprises bringing acetone into contact in the liquid phase at a temperature of from 0° to 30° C. with a catalyst comprising a calcium compound selected from calcium oxide, calcium hydroxide, hydrous calcium oxide and hydrous calcium hydroxide, supported on granules of a lithia-alumina complex analogous to sodium beta-alumina and to the spinels with a defective lattice.

4. A continuous process as claimed in claim 3 in which a liquid space velocity of up to 1 litre of acetone per litre of bulk catalyst volume per hour and a temperature of from 10° to 25° C. are employed.

5. A continuous process for the production of aldol condensation products which comprises bringing a ketone selected from methyl ethyl ketone, methyl propyl ketone and methyl isopropyl ketone into contact in the liquid phase at from 0° to 30° C. and at a space velocity of up to 1 litre of ketone per litre of bulk catalyst volume per hour with a catalyst comprising a calcium compound selected from calcium oxide, calcium hydroxide, hydrous calcium oxide and hydrous calcium hydroxide, supported on granules of a lithia-alumina complex analogous to sodium beta-alumina and to the spinels with a defective lattice.

6. A process as claimed in claim 1 which is operated so that the catalyst is substantially immersed in the liquid starting material.

7. A process as claimed in claim 1 in which the catalyst is reactivated by calcining, moistening with water and drying.

FRANCIS RICHARD CHARLTON.
DENNIS ALBERT DOWDEN.

References Cited in the file of this patent

UNITED STATES PATENTS

| Number | Name | Date |
|---|---|---|
| 1,654,103 | Thomson | Dec. 27, 1927 |
| 2,130,592 | McAllister et al. | Sept. 20, 1938 |
| 2,474,440 | Smith et al. | June 28, 1949 |